US012107303B1

(12) United States Patent
Hong

(10) Patent No.: US 12,107,303 B1
(45) Date of Patent: Oct. 1, 2024

(54) MEMBRANE HUMIDIFIER FOR FUEL CELLS

(71) Applicant: DS FILTER CO., LTD., Gongju-si (KR)

(72) Inventor: Ji Seung Hong, Suwon-si (KR)

(73) Assignee: DS FILTER CO., LTD., Gongju-si (KR)

( * ) Notice: Subject to any disclaimer, the term of this patent is extended or adjusted under 35 U.S.C. 154(b) by 0 days.

(21) Appl. No.: 18/280,756

(22) PCT Filed: Oct. 26, 2022

(86) PCT No.: PCT/KR2022/016445
§ 371 (c)(1),
(2) Date: Sep. 7, 2023

(87) PCT Pub. No.: WO2023/113210
PCT Pub. Date: Jun. 22, 2023

(30) Foreign Application Priority Data

Dec. 13, 2021 (KR) .................. 10-2021-0177368

(51) Int. Cl.
*B01D 63/04* (2006.01)
*H01M 8/04119* (2016.01)

(52) U.S. Cl.
CPC ........ *H01M 8/04149* (2013.01); *B01D 63/04* (2013.01); *B01D 2313/20* (2013.01); *B01D 2313/44* (2013.01)

(58) Field of Classification Search
CPC ............... H01M 8/04149; B01D 63/04; B01D 2313/20; B01D 2313/44
See application file for complete search history.

(56) References Cited

U.S. PATENT DOCUMENTS

| 2,867,913 | A | * | 1/1959 | Faucher | F26B 21/06 236/44 R |
| 11,677,084 | B1 | * | 6/2023 | Feng | H01M 8/04126 429/413 |
| 2001/0015501 | A1 | * | 8/2001 | Katagiri | H01M 8/04126 261/154 |
| 2001/0021467 | A1 | * | 9/2001 | Suzuki | H01M 8/04119 261/94 |
| 2001/0029949 | A1 | * | 10/2001 | Blackhurst | A61M 16/1055 128/205.27 |
| 2002/0139320 | A1 | * | 10/2002 | Shimanuki | B01D 63/034 122/362 |
| 2007/0210463 | A1 | * | 9/2007 | Koenig | H01M 8/04126 261/104 |

(Continued)

FOREIGN PATENT DOCUMENTS

CN 104081130 A * 10/2014 ............ F24F 12/006
KR 10-2013-0034404 4/2013

(Continued)

*Primary Examiner* — Kaity V Chandler
(74) *Attorney, Agent, or Firm* — LEX IP MEISTER, PLLC

(57) ABSTRACT

A membrane humidifier for a fuel cell is disclosed. The membrane humidifier for a fuel cell includes a first housing (10) including a humidity inlet port (12) suctioning a wet flow thereinto and a dry air outlet port (14) discharging dry air, and a second housing (80) correspondingly coupled to the first housing, and including a humidity outlet port discharging a wet flow and a dry air inlet port suctioning dry air.

5 Claims, 9 Drawing Sheets

(56) References Cited

U.S. PATENT DOCUMENTS

| | | | |
|---|---|---|---|
| 2008/0182140 A1* | 7/2008 | Buechi | H01M 8/04126 |
| | | | 429/456 |
| 2008/0237902 A1* | 10/2008 | Nagumo | B01D 53/22 |
| | | | 261/104 |
| 2013/0065140 A1* | 3/2013 | Kim | B01D 63/04 |
| | | | 429/413 |
| 2015/0367279 A1* | 12/2015 | Kim | H01M 8/04149 |
| 2016/0036075 A1* | 2/2016 | Kim | H01M 8/04492 |
| 2016/0079616 A1* | 3/2016 | Lee | B01D 53/22 |
| | | | 210/321.88 |
| 2017/0077531 A1* | 3/2017 | Kim | B01F 23/20 |
| 2017/0149074 A1* | 5/2017 | Kim | H01M 8/04126 |
| 2020/0153004 A1* | 5/2020 | Oh | H01M 8/04835 |
| 2020/0161678 A1* | 5/2020 | Bauer | H01M 8/04149 |
| 2021/0180816 A1* | 6/2021 | Lotfi | F24F 6/18 |
| 2022/0013798 A1* | 1/2022 | Oh | B01D 63/02 |
| 2022/0029180 A1* | 1/2022 | Lee | B01D 63/02 |
| 2022/0093946 A1* | 3/2022 | Kim | F28D 7/163 |
| 2022/0376281 A1* | 11/2022 | Yang | B01D 63/031 |
| 2023/0011951 A1* | 1/2023 | Jung | B60H 3/0028 |
| 2023/0035889 A1* | 2/2023 | Han | H01M 8/04149 |
| 2023/0170499 A1* | 6/2023 | Lee | H01M 8/04089 |
| | | | 429/414 |
| 2023/0178765 A1* | 6/2023 | Shrivastava | H01M 8/04164 |
| | | | 429/414 |
| 2024/0181396 A1* | 6/2024 | Heinz | B01D 63/02 |

FOREIGN PATENT DOCUMENTS

| | | | | |
|---|---|---|---|---|
| KR | 10-2016-0150414 | | 12/2016 | |
| KR | 10-2019-0081736 | | 7/2019 | |
| KR | 10-2021-0144114 | | 11/2021 | |
| KR | 102447975 B1 * | | 12/2021 | Y02E 60/50 |

* cited by examiner

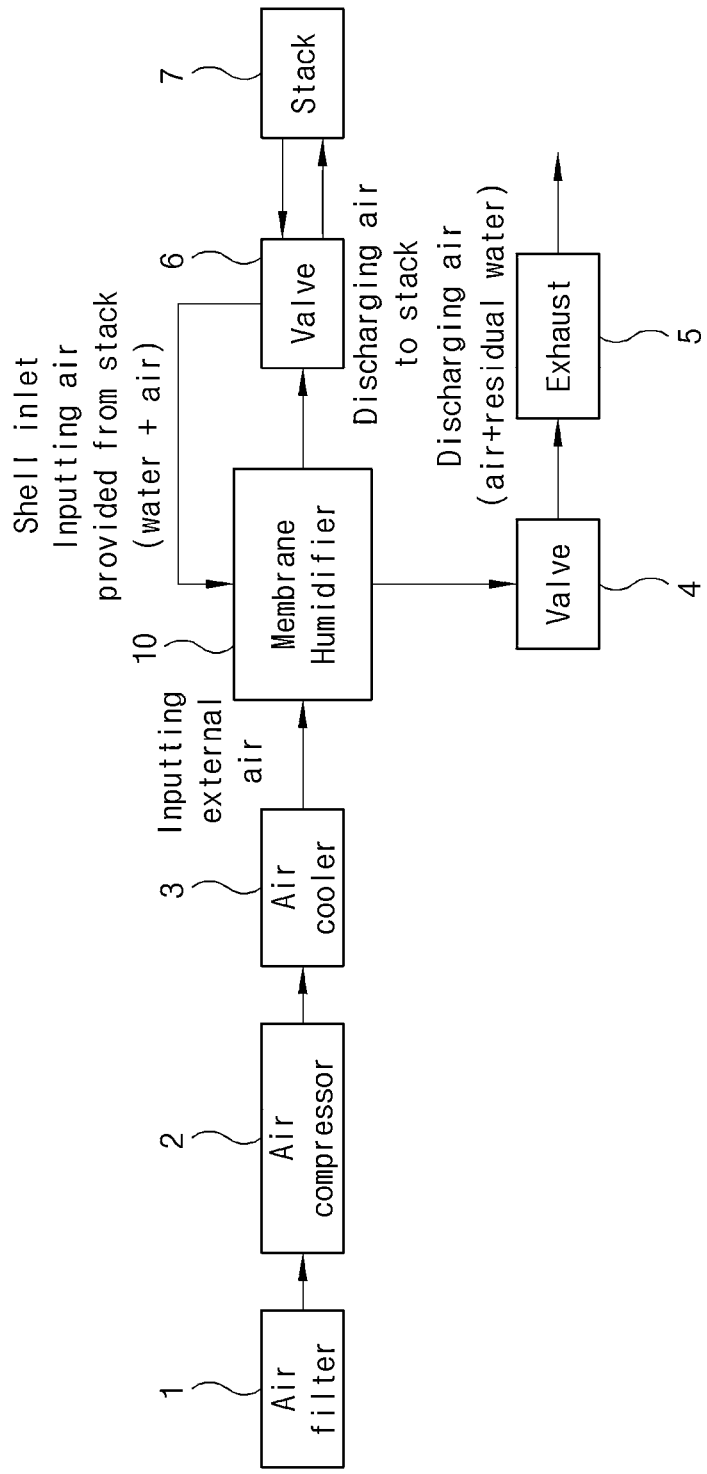
[Fig. 1]

[Fig. 2]
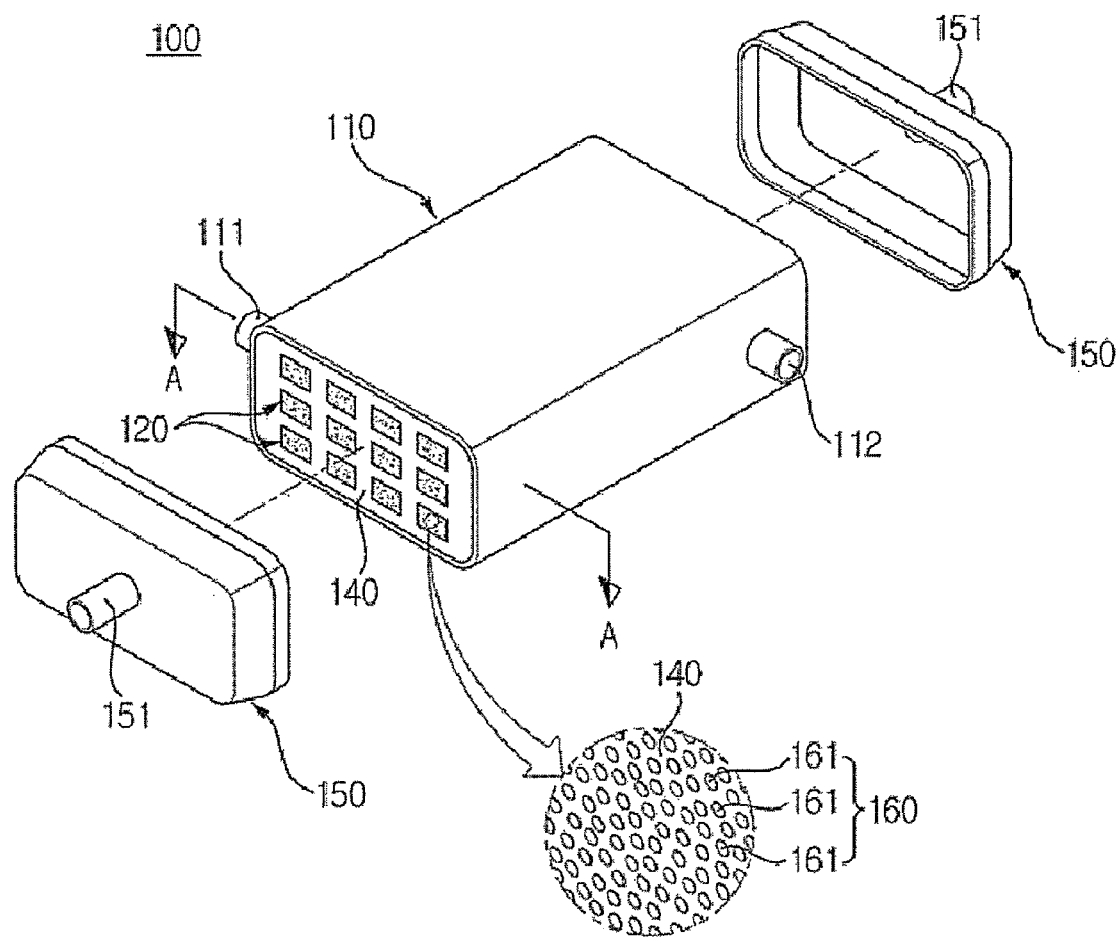

[Fig. 3]
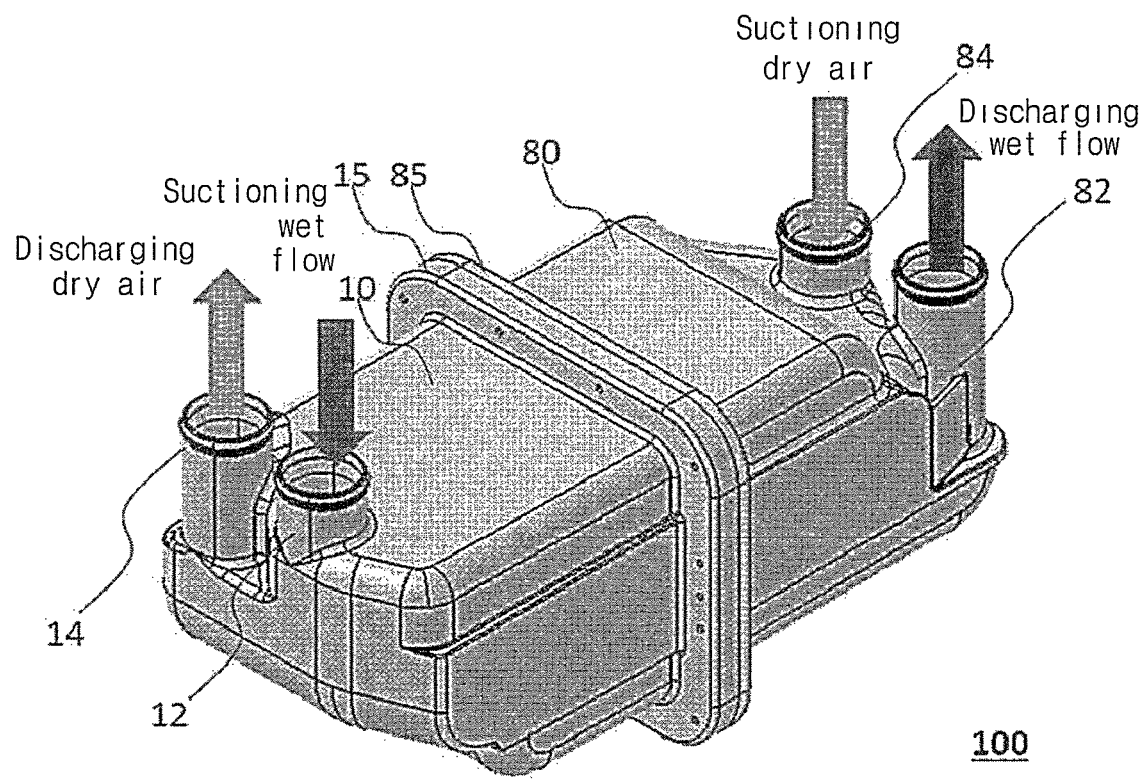

[Fig. 4]
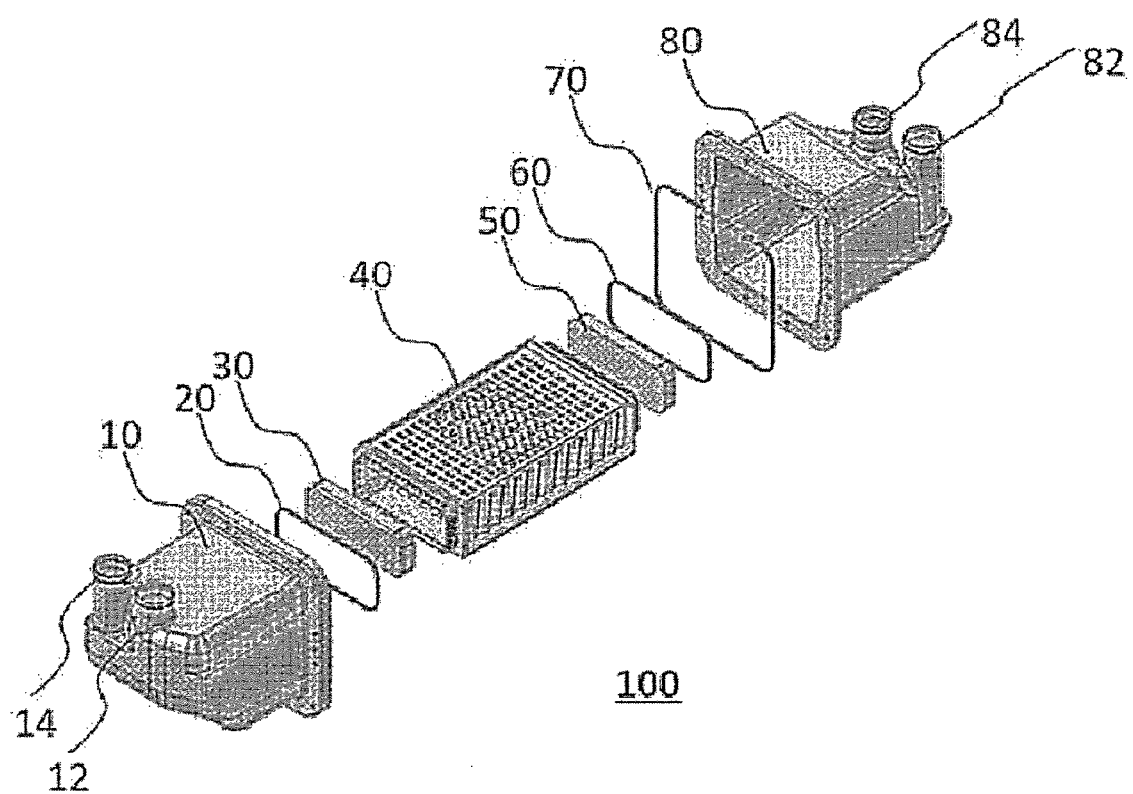

[Fig. 5]
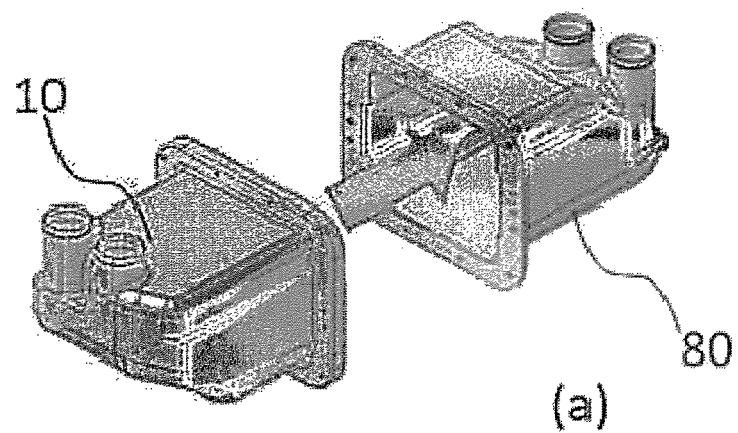
(a)
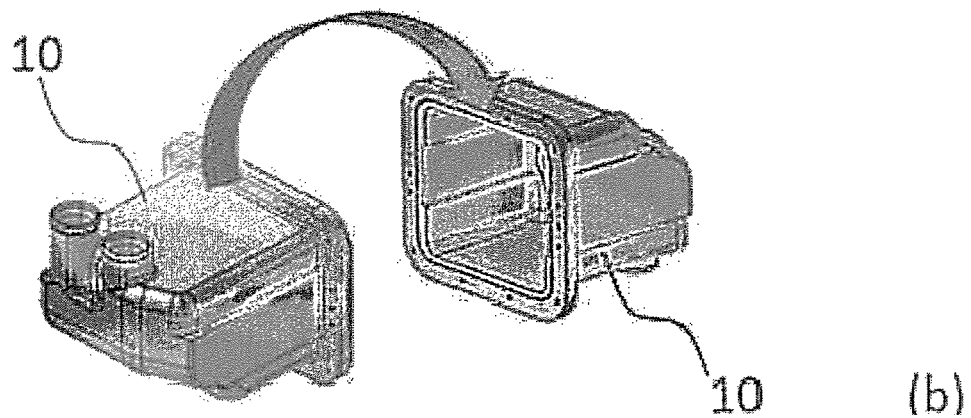
(b)

[Fig. 6]
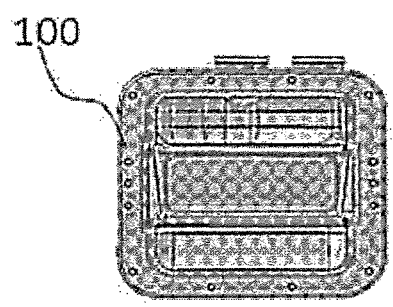
(a)
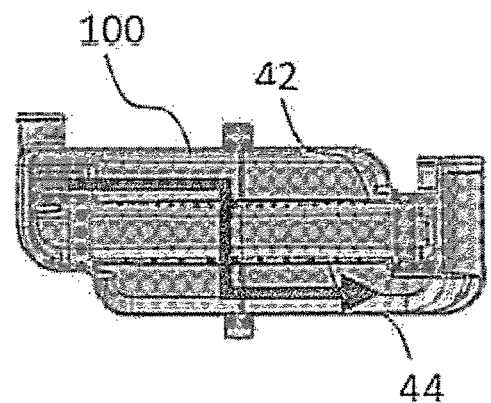
(b)

[Fig. 7]
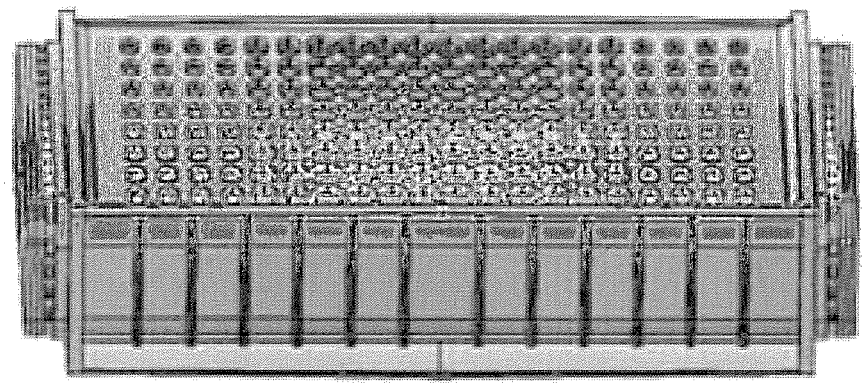
(a) < Cartridge upper end >
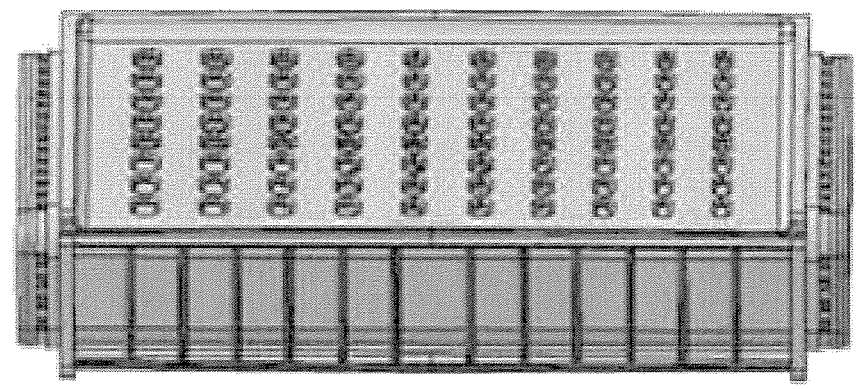
(b) < Cartridge lower end >

[Fig. 8]
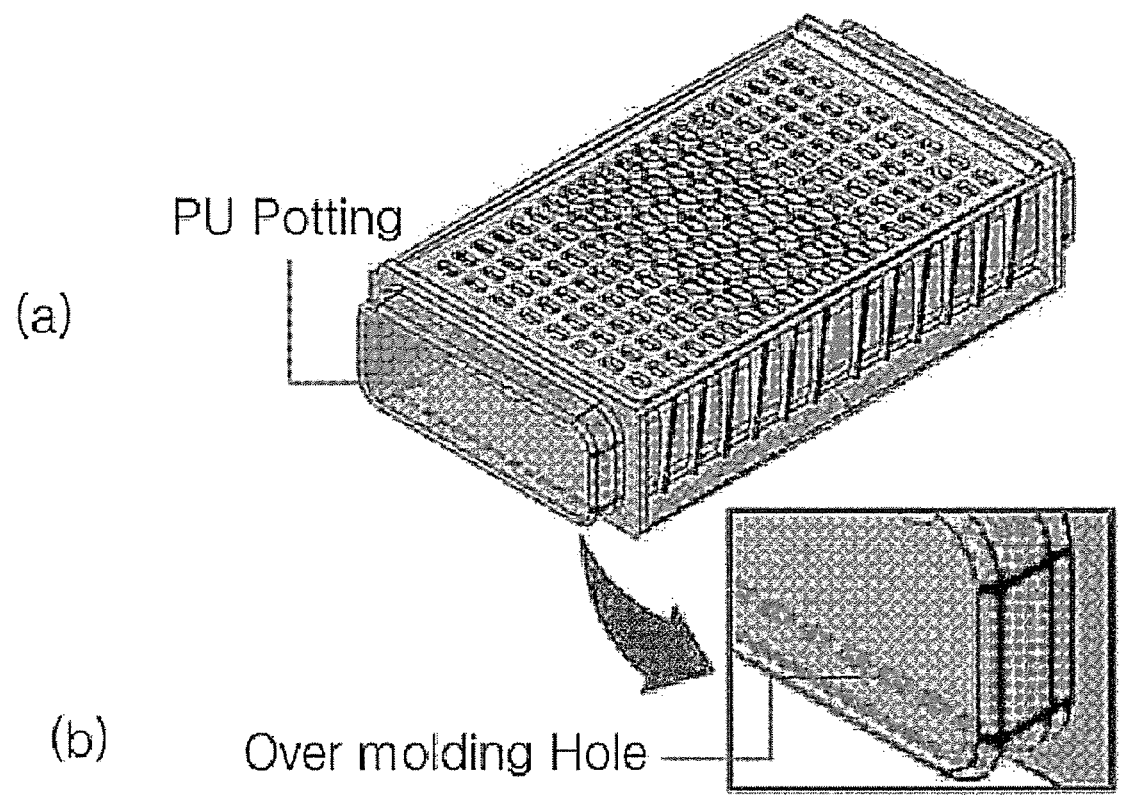

[Fig. 9]
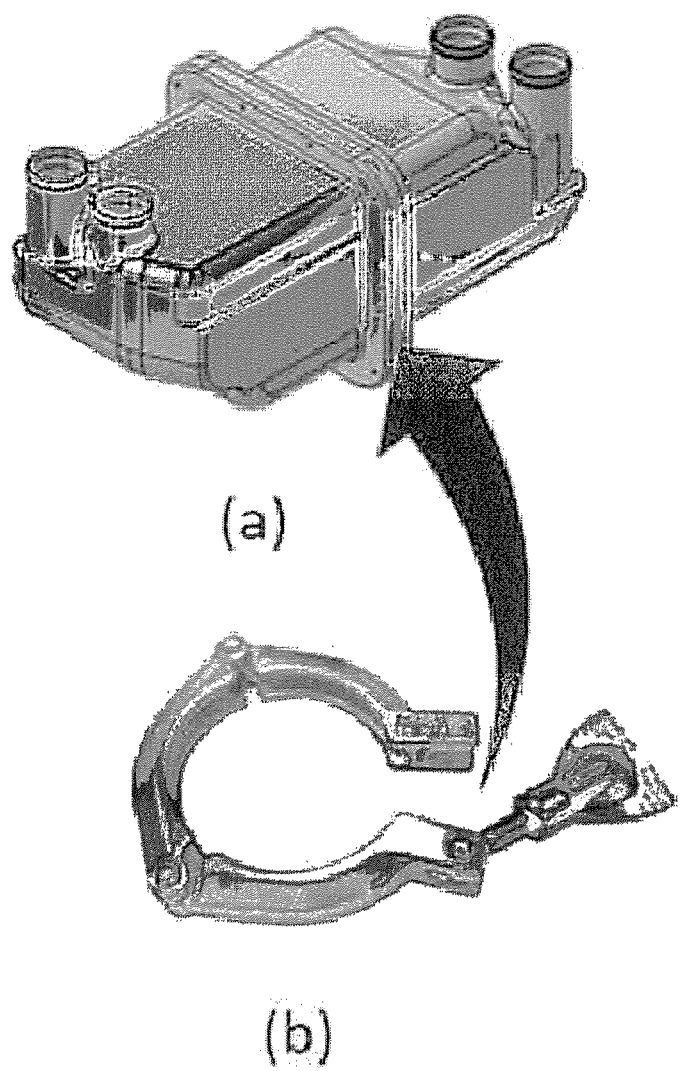
(a)
(b)

MEMBRANE HUMIDIFIER FOR FUEL CELLS

TECHNICAL FIELD

The present disclosure relates to a membrane humidifier for a fuel cell and, more particularly, to a membrane humidifier for a fuel cell, the membrane humidifier having a mechanical assembly structure designed simply to simplify a flow path structure and having of a flow distributing cartridge hole to minimize a dead space of a hollow fiber membrane.

BACKGROUND ART

A fuel cell is a power generation type cell that generates electricity by combining hydrogen and oxygen. Unlike a general chemical cell such as a dry cell and a storage cell, the fuel continue to generate electricity as long as hydrogen and oxygen are supplied, and is more efficient than an internal combustion engine because there is no heat loss in the fuel cell.

Depending on the type of electrolyte used in the fuel cell, the fuel cell is largely classified into a polymer electrolyte type fuel cell (PEMFC), a phosphoric acid type fuel cell (PAFC), a molten carbonate type fuel cell (MCFC), a solid oxide type fuel cell (SOFC), an alkali type fuel cell (AFC), and the like.

A structure and a function of a membrane humidifier used exclusively for a hydrogen fuel cell will be briefly described with reference to FIG. 1.

FIG. 1 is a block diagram showing a structure and a function of a membrane humidifier generally applied.

Referring to FIG. 1, outdoor air is input into a membrane humidifier 10 through an air filter 1, an air compressor 2, and an air cooler 3. Here, the membrane humidifier 10 includes valves 4 and 6 installed at a rear end thereof, and the valves are respectively connected to a stack 7 or an exhaust part 5 to discharge air.

A function of the membrane humidifier 10 with the above-described structure is to supply moisture to the dry outdoor air by using the moisture discharged from the stack so as to increase the generation efficiency of the stack serving as a generator, and to prevent an electrolyte polymer membrane inside the stack from drying so as to ensure durability.

However, the above-described structure of the membrane humidifier is complicated, causing a problem of high cost in manufacturing elements.

Furthermore, the conventional membrane humidifier has a dispersed flow path, causing a problem in that it is difficult to improve the durability.

Furthermore, the conventional membrane humidifier has a problem in that the elements thereof are exposed to the outside space to degrade the airtight properties.

FIG. 2 is a view showing a structure of a hollow fiber membrane cartridge type humidifying module according to the related art.

The hollow fiber membrane cartridge type humidifying module according to the related art includes a housing, common hollow fiber membrane cartridges fitted in opposite ends of a plurality of hollow fiber membrane bundles inserted into the housing in a longitudinal direction of the housing, a partition part provided inside the housing and partitioning the plurality of hollow fiber membrane bundles, and a potting part potting the plurality of common hollow fiber membrane cartridges and the plurality of hollow fiber membrane bundles into the housing simultaneously.

However, the hollow fiber membrane cartridge type humidifying module with the above-described structure has a method of inserting and potting the common cartridge into the partition part, and there is a problem in that a process of assembling the hollow fiber membrane has to be performed for each housing partition part so that the assembly time is excessively long and thus productivity is reduced.

Furthermore, Korean Patent Application Publication No. KR10-2016-0150414 (Dec. 30, 2016) disclosed the technique of potting opposite ends of a hollow fiber membrane bundle to the housing, and a difference in the coefficients of thermal expansion between the housing and the potting (PU) is large, causing a problem of potting separation.

DISCLOSURE

Technical Problem

Accordingly, the present disclosure has been made keeping in mind the above problems, and an objective of the present disclosure is to provide a membrane humidifier for a fuel cell, the membrane humidifier having a simple assembly structure with an outer module thereof consisting of two housings.

Another objective of the present disclosure is to provide a membrane humidifier for a fuel cell, wherein, in configuration of a fuel cell, the membrane humidifier is designed simply in a flow path structure to reduce air turbulence to simplify the flow path structure and to improve the performance thereof.

A further objective of the present disclosure is to provide a membrane humidifier for a fuel cell, wherein a structure of reinforcing the airtight properties of a membrane humidifier cartridge and assembling a module clamp is adopted to enhance maintenance efficiency.

Technical Solution

In order to achieve the above objectives, according to one aspect of the present disclosure, there is provided a membrane humidifier for a fuel cell, the membrane humidifier including: a first housing including a humidity inlet port configured to suction a wet flow thereinto and a dry air outlet port configured to discharge dry air; a second housing correspondingly coupled to the first housing the first housing, and including a humidity outlet port configured to discharge a wet flow and a dry air inlet port configured to suction dry air; and a cartridge located inside the first housing and the second housing, wherein inside the cartridge, a flow path through which the wet flow is suctioned or discharged may be provided into any one selected among a first path through which the wet flow may move forward at an upper portion and move downward and then be discharged toward a lower outlet, or a second path through which the wet flow may move forward at a lower portion and move upward and then be discharged toward an upper outlet, thereby providing a structure in which turbulence generated between the first housing or the second housing and the cartridge may be reduced and vibrations or external force applied to a hollow fiber membrane is reduced.

A first cartridge gasket in contact with the humidity inlet port and the dry air outlet port and the cartridge configured to generate and filter the flow path may be provided inside the first housing, a first potting part and a second potting part may be installed at a front portion and a rear portion of the cartridge, a second cartridge gasket may be installed at a rear surface of the second potting part, a main gasket may be installed at a rear surface of the second cartridge gasket, and the second housing is fastened to the above-described assembly, thereby achieving a single structure.

The membrane humidifier for a fuel cell may be used by fastening the first housing or the second housing that may have the same structure by changing a direction upside down.

The humidity inlet port may be provided at an upper end of the cartridge and the humidity outlet port may be provided at a lower end thereof to form a plurality of holes to allow the wet flow to pass therethrough, and the plurality of holes may be formed to have different hole sizes in response to a flow direction to allow a flow of the wet flow to be evenly distributed.

The cartridge may be made of a polycarbonate (PC) material, and a polyurethane (PU) material may be used at an end thereof to enhance adhesion of bi-materials and the portion may be treated in an over molding manner, and one or more lateral hole may be provided at an end of the cartridge, and a function of connecting an inner portion to an outer portion of the over-molded portion may be performed through the hole.

The first housing and the second housing may be configured to be fastened to each other and separated from each other via a clamp.

Advantageous Effects

According to the preferred embodiment of the present disclosure, as the outer module of the membrane humidifier consists of only two housings, an effect of providing the membrane humidifier for a fuel cell having the simple assembly structure can be implemented.

Furthermore, according to the preferred embodiment of the present disclosure, in configuration of a fuel cell, the air turbulence is reduced with the structure flow path structure, and the membrane humidifier for a fuel cell with the simple flow path structure and improved performance can be provided.

Furthermore, according to the preferred embodiment of the present disclosure, as the structure of reinforcing the airtight properties of the membrane humidifier cartridge and assembling the module clamp is adopted, an excellent effect of providing the membrane humidifier for a fuel cell with improved maintenance efficiency can be implemented.

DESCRIPTION OF DRAWINGS

FIG. 1 is a block diagram showing a structure and a function of a membrane humidifier generally applied;

FIG. 2 is a structure view showing a structure of a hollow fiber membrane cartridge type humidifying module according to the related art;

FIG. 3 is an exterior structure view showing an assembled structure of a membrane humidifier for a fuel cell according to a preferred embodiment of the present disclosure;

FIG. 4 is an exploded-perspective view showing an internal structure of the membrane humidifier for a fuel cell according to the preferred embodiment of the present disclosure;

FIG. 5 is a view showing an example of a coupling structure of the membrane humidifier for a fuel cell according to the preferred embodiment of the present disclosure;

FIG. 6 is a view showing a flow path structure to simplify a flow path structure of the membrane humidifier for a fuel cell according to the preferred embodiment of the present disclosure;

FIG. 7 is a view showing a structure and operation flow distributing cartridge holes of the membrane humidifier for a fuel cell according to the preferred embodiment of the present disclosure;

FIG. 8 is a detailed view showing a cartridge potting structure and operation of the membrane humidifier for a fuel cell according to the preferred embodiment of the present disclosure; and FIG. 9 is an assembly view showing a clamping structure of a module of the membrane humidifier for a fuel cell according to the preferred embodiment of the present disclosure.

MODE FOR INVENTION

Hereinbelow, a preferred embodiment of the present disclosure will be described in configuration, operation, and effect thereof in detail with reference to accompanying drawings.

Embodiment

According to the preferred embodiment of the present disclosure, the membrane humidifier for a fuel cell includes: a first housing 10 including a humidity inlet port 12 configured to suction a wet flow thereinto, and a dry air outlet port 14 configured to discharge dry air; a second housing 80 correspondingly coupled to the first housing, and including a humidity outlet port configured to discharge a wet flow and a dry air inlet port configured to suction dry air; and a cartridge 40 located inside the first housing 10 and the second housing 80, wherein inside the cartridge 40, a flow path through which the wet flow is suctioned or discharged is provided into any one selected among a first path through which the wet flow moves forward an upper portion and moves downward and then is discharged toward a lower outlet, or a second path through which the wet flow moves forward at a lower portion and moves upward and then is discharged toward an upper outlet, thereby providing a structure in which turbulence generated between the first housing 10 or the second housing 80 and the cartridge 40 is reduced and vibrations or external force applied to a hollow fiber membrane is reduced.

A structure of the membrane humidifier 100 for a fuel cell according to the preferred embodiment of the present disclosure configured as described above will be described with reference to FIG. 3.

Hereinbelow, the configuration, operation, and effect will be described on the basis of the drawings and the reference numerals shown in the drawings.

FIG. 3 is an exterior structure view showing an assembled structure of the membrane humidifier for a fuel cell according to the preferred embodiment of the present disclosure.

Reference numeral 10 is the first housing, has a structure in which the humidity inlet port 12 configured to suction wet flow thereinto and the dry air outlet port 14 configured to discharge dry air protrude outward.

The reference numeral 80 is the second housing, and is formed such that a humidity outlet port 82 configured to discharge a wet flow and a dry air inlet port 84 configured to suction dry air protrude outward.

Here, the cartridge, etc. is installed inside the first housing 10 and the second housing 80 to form a flow path and to perform filtering.

The first housing 10 and the second housing 80 respectively have protruding fastening portions 15 and 85 to couple the embedded elements to each other to perform a function of the membrane humidifier 100 for a fuel cell.

Next, the detailed structure according to the preferred embodiment of the present disclosure will be described in detail with reference to FIGS. 4 to 5.

FIG. 4 is an exploded-perspective view showing an internal structure of the membrane humidifier for a fuel cell according to the preferred embodiment of the present disclosure. FIG. 5 is a view showing an example of a coupling structure of the membrane humidifier for a fuel cell according to the preferred embodiment of the present disclosure.

According to the embodiment of the present disclosure, a first cartridge gasket 20 in contact with the humidity inlet port 12 and the dry air outlet port 14 and the cartridge 40 providing the flow path and performing filtering are installed inside the first housing 10. A first potting part 30 and a second potting part 50 are installed at a front portion and a rear portion of the cartridge 40, a second cartridge gasket 60 is installed at a rear surface of the second potting part 50, a main gasket 70 is installed at a rear surface of the second cartridge gasket 60, and the second housing 80 is fastened to the above assembled parts to achieve a single structure.

The first cartridge gasket 20 in contact with the humidity inlet port 12 and the dry air outlet port 14 and the cartridge 40 providing the flow path and performing filtering are installed in the first housing 10.

The first cartridge gasket 20 may be made of a material with high airtight properties and high flexibility to prevent leakage of dry air and wet flow.

The first potting part 30 and the second potting part 50 are installed at the front portion and the rear portion of the cartridge 40, respectively. The first cartridge gasket 20 and the second cartridge gasket 60 are installed at the front portion of the first potting part 30 and the rear portion H the second potting part 50, respectively.

Furthermore, the membrane humidifier 100 for a fuel cell has the structure in which the main gasket 70 is installed at the rear surface of the second cartridge gasket 60, and the main gasket 70 is installed in the second housing 80.

With the above-described structure, usage of large space is reduced and elements such as the cartridge, etc. capable of providing the flow path and performing filtering can be embedded inside the first housing 10 and the second housing 80, so that the membrane humidifier for a fuel cell with the simple structure can be implemented.

Next, referring to FIG. 5, according to the preferred embodiment of the present disclosure, various structural examples of the membrane humidifier for a fuel cell will be described.

FIG. 5 is a view showing an example of a coupling structure of the membrane humidifier for a fuel cell according to the preferred embodiment of the present disclosure.

In the embodiment of the present disclosure, the membrane humidifier for a fuel cell is characterized in that the first housing or the second housing that have the same structure is changed upside down to be fastened.

First, referring to FIG. 5*a*, there is a structure in which the first housing 10 is directly coupled to the second housing 80 and the cartridge is embedded therein, and Referring to FIG. 5*b*, two first housings 10 are directly coupled to each other, and the coupled housings are fastened by changing a direction thereof.

With the above-described structure, according to the preferred embodiment of the present disclosure, the structure that can install the membrane humidifier in various combinations can be provided.

Next, according to the preferred embodiment of the present disclosure, a process in which simplification of a flow path structure is achieved will be described with reference to FIGS. 6 to 7.

FIG. 6 is a view showing a flow path structure to simplify the flow path structure of the membrane humidifier for a fuel cell according to the preferred embodiment of the present disclosure. FIG. 7 is a view showing a structure and operation of flow distributing cartridge holes of the membrane humidifier for a fuel cell according to the preferred embodiment of the present disclosure.

Referring to FIG. 6*a*, a structure of the embedded cartridge 40 is presented. As shown in FIGS. 6*b* and 7, the cartridge 40 consists of an upper end portion and a lower end portion, and the flow path is provided by penetrating the cartridge upper end portion 42 and the cartridge lower end portion.

Furthermore, the cartridge 40 is characterized in that the humidity inlet port 12 is installed at the upper end of the cartridge 40 and the humidity outlet port 82 is installed at the lower end thereof, thereby providing a plurality of holes through which a wet flow passes, and the holes are formed in different sizes in response to a flow direction so as to distribute the wet flow evenly.

As described above, the plurality of holes formed in the cartridge 40 is provided, and the holes are formed to have different sizes, thereby implementing a friction adjustment structure that can distribute the wet flow evenly in the process of formation and progress of the flow path.

FIG. 8 is a detailed view showing a cartridge potting structure and operation of the membrane humidifier for a fuel cell according to the preferred embodiment of the present disclosure. FIG. 9 is an assembly view showing a clamping structure of a module of the membrane humidifier for a fuel cell according to the preferred embodiment of the present disclosure.

Furthermore, the cartridge 40 is made of a polycarbonate (PC) material, and adopts a polyurethane (PU) material at an end thereof to strengthen adhesion of bi-materials and the portion is treated in an over molding manner, and one or more lateral hole is provided at an end of the cartridge 40, and a function of connecting an inner portion to an outer portion of the over-molded portion is performed through the hole.

Here, over molding refers to as a process of joining two or more molded plastic or elastomeric parts into one finished product. In the over molding process, after a base layer part is first molded, an additional plastic layer(s) is molded over the previously molded part.

With the above-described structure, according to the preferred embodiment of the present disclosure, an outer module of the membrane humidifier consists of two housings, so that an effect of providing the membrane humidifier for a fuel cell with the simple assembly structure can be implemented.

Furthermore, according to the preferred embodiment of the present disclosure, in configuration of a fuel cell, the air turbulence is reduced with the structure flow path structure, and the membrane humidifier for a fuel cell with the simple flow path structure and improved performance can be provided.

Furthermore, according to the preferred embodiment of the present disclosure, the first housing 10 and the second housing are configured to be fastened to and separated from each other by a clamp. As the structure of reinforcing the airtight properties of the membrane humidifier cartridge and assembling the module clamp is adopted, an excellent effect of providing the membrane humidifier for a fuel cell with improved maintenance efficiency can be implemented.

Although the preferred embodiment of the present disclosure has been descried for illustrative purposes, various modification, additions, and substitutions of the technical sprit thereof are possible by those skilled in the art within the same range and are included in the scope of rights of the present disclosure.

The invention claimed is:

1. A membrane humidifier (100) for a fuel cell, the membrane humidifier (100) comprising:
   a first housing (10) comprising a humidity inlet port (12) configured to suction a wet flow thereinto and a dry air outlet port (14) configured to discharge dry air; a second housing (80) correspondingly coupled to the first housing the first housing, and comprising a humidity outlet port configured to discharge a wet flow and a dry air inlet port configured to suction dry air; and a cartridge (40) located inside the first housing (10) and the second housing (80),
   wherein inside the cartridge (40), a flow path through which the wet flow is suctioned or discharged is provided into any one selected among a first path through which the wet flow moves forward at an upper portion and moves downward and then is discharged toward a lower outlet, or a second path through which the wet flow moves forward at a lower portion and moves upward and then is discharged toward an upper outlet, thereby providing a structure in which turbulence generated between the first housing (10) or the second housing (80) and the cartridge (40) is reduced and vibrations or external force applied to a hollow fiber membrane is reduced,
   wherein the first housing (10) and the second housing (80) enclose a first cartridge gasket (20) in contact with the humidity inlet port (12) and the dry air outlet port (14), the cartridge (40) in contact with the first cartridge gasket (20) and configured to generate and filter the flow path, a first potting part (30) installed at a front portion of the cartridge (40), a second potting part (50) installed at a rear portion of the cartridge (40), and a second cartridge gasket (60) installed at the rear portion of the cartridge (40),
   a main gasket (70) is installed between the first housing (10) and the second housing (80), and
   the second housing (80) is fastened to the first housing (10), thereby achieving a single structure.

2. The membrane humidifier (100) of claim 1, wherein the membrane humidifier for a fuel cell is used by fastening the first housing or the second housing that have the same structure by changing a direction upside down.

3. The membrane humidifier (100) of claim 1, wherein the humidity inlet port (12) is provided at an upper end of the cartridge (40) and the humidity outlet port (82) is provided at a lower end thereof to form a plurality of holes allowing the wet flow to pass therethrough, and the plurality of holes is formed to have different hole sizes in response to a flow direction to allow a flow of the wet flow to be evenly distributed.

4. The membrane humidifier (100) of claim 1, wherein the cartridge (40) is made of a polycarbonate (PC) material, and a polyurethane (PU) material is used at an end thereof to enhance adhesion of bi-materials and the portion is treated in an over molding manner, and one or more lateral hole is provided at an end of the cartridge (40), and a function of connecting an inner portion to an outer portion of the over-molded portion is performed through the hole.

5. The membrane humidifier (100) of claim 1, wherein the first housing (10) and the second housing are configured to be fastened to each other and separated from each other via a clamp.

* * * * *